B. C. COX.
Sulky-Cultivator.
No. 164,148.  Patented June 8, 1875.
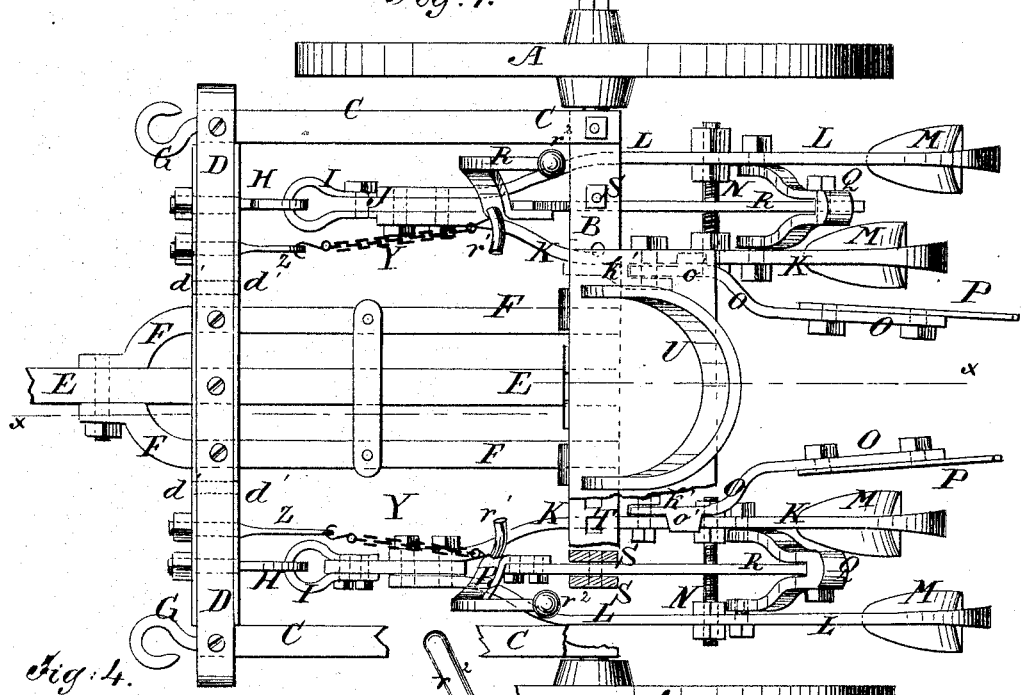
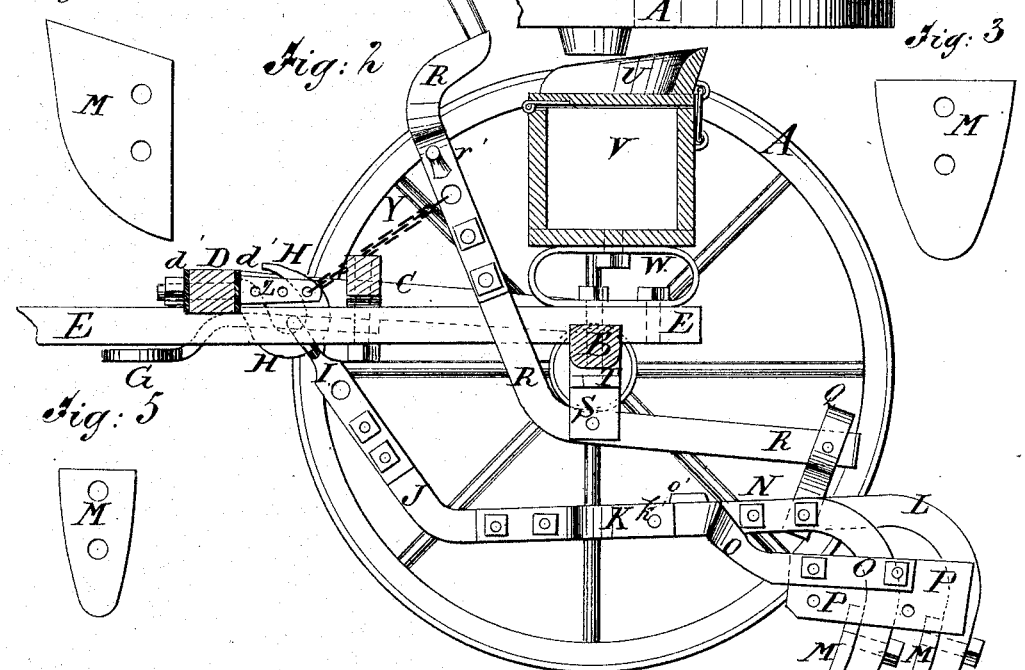
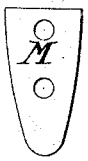
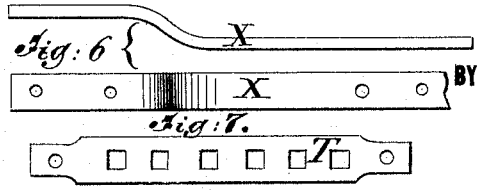
WITNESSES:  INVENTOR:

UNITED STATES PATENT OFFICE.

BURTON C. COX, OF COOPER HILL, MISSOURI.

IMPROVEMENT IN SULKY-CULTIVATORS.

Specification forming part of Letters Patent No. 164,148, dated June 8, 1875; application filed January 30, 1875.

*To all whom it may concern:*

Be it known that I, BURTON C. COX, of Cooper Hill, in the county of Osage and State of Missouri, have invented a new and useful Improvement in Sulky-Cultivator, of which the following is a specification:

Figure 1 is a top view of my improved cultivator, part being broken away to show the the construction. Fig. 2 is a vertical longitudinal section of the same, taken through the line $x\ x$, Fig. 1. Figs. 3, 4, and 5 show different kinds of plow-plates. Fig. 6 is an edge and side view of a false plow-beam. Fig. 7 is a detail view of the perforated adjusting-bar.

Similar letters of reference indicate corresponding parts.

The invention will first be fully described, and then pointed out in the claim.

A are the wheels, which revolve upon the journals of the axle B. To the axle B, at the inner ends of the hubs of the wheels A, are bolted the rear ends of two bars, C. To the forward ends of the bars C are attached the ends of a cross-bar, D, which is strengthened by iron plates $d'$ attached to its front and rear sides. E is the tongue, which is attached to the cross-bar D and axle B. F are the hounds or tongue-braces, which are attached to the axle B and cross-bar D, and the forward ends of which are curved inward, and are attached to the tongue E. G are the draft-hooks, the shanks of which are attached to the forward parts of the bars C. H are hook-bolts, which are secured to the end parts of the cross-bar D, with their hooks projecting to the rearward. Several holes are formed in the cross-bar D to receive the hook-bolts H, so that they may be readily adjusted toward or from each other, according as it is desired to have the plows work closer to or farther from the plants. I are loops, which are hooked upon the hooks H, and the arms of which are bolted to the upper ends of the bent or angle bars J, several holes being formed in said arms to receive the said bolts, so that the bars J can be readily raised and lowered to adjust the plows to work shallower or deeper in the ground, as may be desired. K and L are the inner and outer plow-beams, the forward ends of which are bolted to the opposite sides of the rear ends of the bent bars J. The beams K L are bent outward to bring them to the proper distance apart, extend to the rearward, and their rear ends are bent downward to serve as standards for the attachment of the plows M. The inner beams K are made a little shorter than the outer beams L, to bring the inner plow at the proper distance in advance of the outer one. The plow-plates M may be shovel-plows, as shown in Fig. 3, half-shovel or turn plows, as shown in Fig. 4, or bull-tongue plows, as shown in Fig. 5. The two beams K L are connected by a rod, N, which passes through their rear parts a little in front of their downward bends. Upon the ends of the rods N are cut screw-threads, and each rod is provided with fan-nuts, which are arranged one upon each side of each of the beams K L. To the inner side of the middle part of the inner beams K is secured a half-keeper, $k'$, to which and the said beam K is pivoted the end of a bar, O, which is bent inward and downward, and projects to or a little beyond the rear part of the said beam K. To the rear part of the bar O is bolted a guard or fender-plate, P, to prevent clods, lumps, and other rubbish from being thrown against the young plants and injuring them. The plates P have two or more sets of holes formed through them to receive the bolts, so that they may be readily adjusted higher or lower to let more or less soil pass to the plants. Upon the upper edge of the forward part of the bars O is formed a projection or toe, $o'$, which rests upon the upper edge of the beam K, and serves as a stop to prevent the fender from dropping down too low. To the beams K L, at or near the downward bends of the beams K, is bolted the ends of the arms of the loops Q, in the upper part or bends of which is pivoted the rear ends of the levers R, which are pivoted to the lower side of the axle B by means of the eyebolts S and plates T. The forward parts of the levers R are bent upward, and have a foot-rest, $r^1$, formed upon their inner sides, and a handle, $r^2$, formed upon their upper ends, so that the driver can operate them with his hands or feet, as may be convenient. The forward upwardly-projecting parts of the levers R are made in two parts or pieces, the adjacent ends of which overlap and are bolted to each other, several holes being formed to receive the said bolts, so that the lengths of said levers may be readily adjusted, as required. The plates T are bolted to the under side of the axle B, and have several holes formed through them corresponding with holes formed through the axle B to receive the eyebolts S, so that the levers R may be readily adjusted wider apart or closer together to correspond with the adjustment of the plows. U is the driver's seat, which is formed upon the cover of the tool-box V, which rests upon springs W attached to the axle B or to the hounds F. When the machine is to be used as a marking-plow the inner beams K are detached, and replaced by the false beams X, which are made without the downward curve at their rear ends, and which are designed simply to receive and support the inner arms of the loops Q. To the upper parts of the levers R are attached the rear ends of the short chains Y, the other ends of which are hooked into one or the other of the holes in the bars Z, the forward ends of which pass through the front cross-bar D of the frame C D, and are secured in place by nuts screwed upon their forward ends. The chains Y and bars Z sustain the downward draft upon the plows, and thus enable the plows to be readily adjusted to work at any desired depth in the ground.

Having thus described my invention, I claim as new and desire to secure by Letters Patent—

The half-keeper $k'$, pivoted toe-bars O $o'$, and plates P, combined with plow-beams, substantially as and for the purpose set forth.

BURTON C. COX.

Witnesses:
 MARIE A. KIDD,
 SARAH J. TWYNAM.